(12) United States Patent  
Kwak et al.

(10) Patent No.: US 9,128,716 B2
(45) Date of Patent: Sep. 8, 2015

(54) MEMORY DEVICE AND CONTROL METHOD

(71) Applicant: NANYA TECHNOLOGY CORPORATION, Tao-Yuan Hsien (TW)

(72) Inventors: Jongtae Kwak, Boise, ID (US); Kallol Mazumder, Plano, TX (US)

(73) Assignee: NANYA TECHNOLOGY CORPORATION, Taoyuan (TW)

( * ) Notice: Subject to any disclaimer, the term of this patent is extended or adjusted under 35 U.S.C. 154(b) by 7 days.

(21) Appl. No.: 14/159,420

(22) Filed: Jan. 20, 2014

(65) Prior Publication Data

US 2015/0205340 A1 Jul. 23, 2015

(51) Int. Cl.
G11C 5/14 (2006.01)
G06F 1/32 (2006.01)

(52) U.S. Cl.
CPC ...................... G06F 1/324 (2013.01)

(58) Field of Classification Search
CPC ............ G11C 5/14; G11C 5/147; G11C 7/22; G11C 7/222

USPC ........................................ 365/227, 194, 233.1
See application file for complete search history.

(56) References Cited

U.S. PATENT DOCUMENTS

| | | | |
|---|---|---|---|
| 7,429,871 B2 * | 9/2008 | Kim et al. | 326/30 |
| 2007/0069774 A1 * | 3/2007 | Kim et al. | 327/158 |
| 2010/0164572 A1 * | 7/2010 | Kim | 327/158 |

* cited by examiner

Primary Examiner — Huan Hoang
(74) Attorney, Agent, or Firm — CKC & Partners Co., Ltd.

(57) ABSTRACT

A memory device and a control method are disclosed herein. The memory device includes a delay locked loop module, a memory bank module and a control module. The delay locked loop module is configured to generate a system clock signal when enabled by a control signal. The memory bank module is configured to read or write data signals in accordance with the system clock signal and a read command or a write command. The control module configured to receive at least one control command to generate the control signal, wherein the control module disables the delay locked loop module, when the memory bank module goes to a precharge mode or a powerdown mode.

13 Claims, 8 Drawing Sheets

MEMORY DEVICE AND CONTROL METHOD

BACKGROUND

1. Field of Invention

The present invention relates an integrated circuit. More particularly, the present invention relates to a memory device.

2. Description of Related Art

In recent years, the performance demands on consumer electronic products, such as mobile phones and tablets, are increasing, which results in the need of higher clock speed and more accurate signal timings for a proper operation.

Memory devices are widely used in the consumer electronic products, such as a dynamic random access memory (DRAM) that has been developed to provide faster operation time. DRAM typically performs read/write operations with a system clock signal generated from a delay lock loop circuit. In order to meet the requirement in high-speed operation, the power consumption of the delay locked loop circuit increases. However, DRAM can operate certain operations without the system clock signal, when DRAM operates in standby conditions. In these operations, the delay locked loop circuit causes an unnecessary consumption of power.

Therefore, a heretofore-unaddressed need exists in the art to address the aforementioned deficiencies and inadequacies.

SUMMARY

An aspect of the present disclosure is to provide a memory device. The memory device includes a delay locked loop module, a memory bank module and a control module. The delay locked loop module is configured to generate a system clock signal when enabled by a control signal. The memory bank module is configured to read or write a plurality of data signals in accordance with the system clock signal and a read command or a write command. The control module configured to receive at least one control command to generate the control signal, wherein the control module disables the delay locked loop, when the memory bank module goes to a precharge mode or a powerdown mode.

Another aspect of the present disclosure is to provide a memory device. The memory device includes a control module, a memory bank module and a delay locked loop module. The control module is configured to generate a plurality of internal control signals corresponding to at least one control command. The memory bank module is configured to perform a read operation or a write operation with a plurality of data signals according to an internal read signal or an internal write signal of the internal control signals and a system clock signal. The delay locked loop module is configured to generate the system clock signal when enabled by the control module. The control module keeps the delay locked loop module being enabled till the read operation or the write operation is completed, when the memory bank module goes to a precharge mode or a powerdown mode.

Yet another aspect of the present disclosure is to provide a control method for a memory device. The control method includes the following operations of generating a control signal to enable a delay locked loop circuit of the memory device for reading or writing a plurality of data signals; and disabling the delay locked loop circuit by the control signal when the memory device is at a powerdown mode or a precharge mode.

These and other features, aspects, and advantages of the present disclosure will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
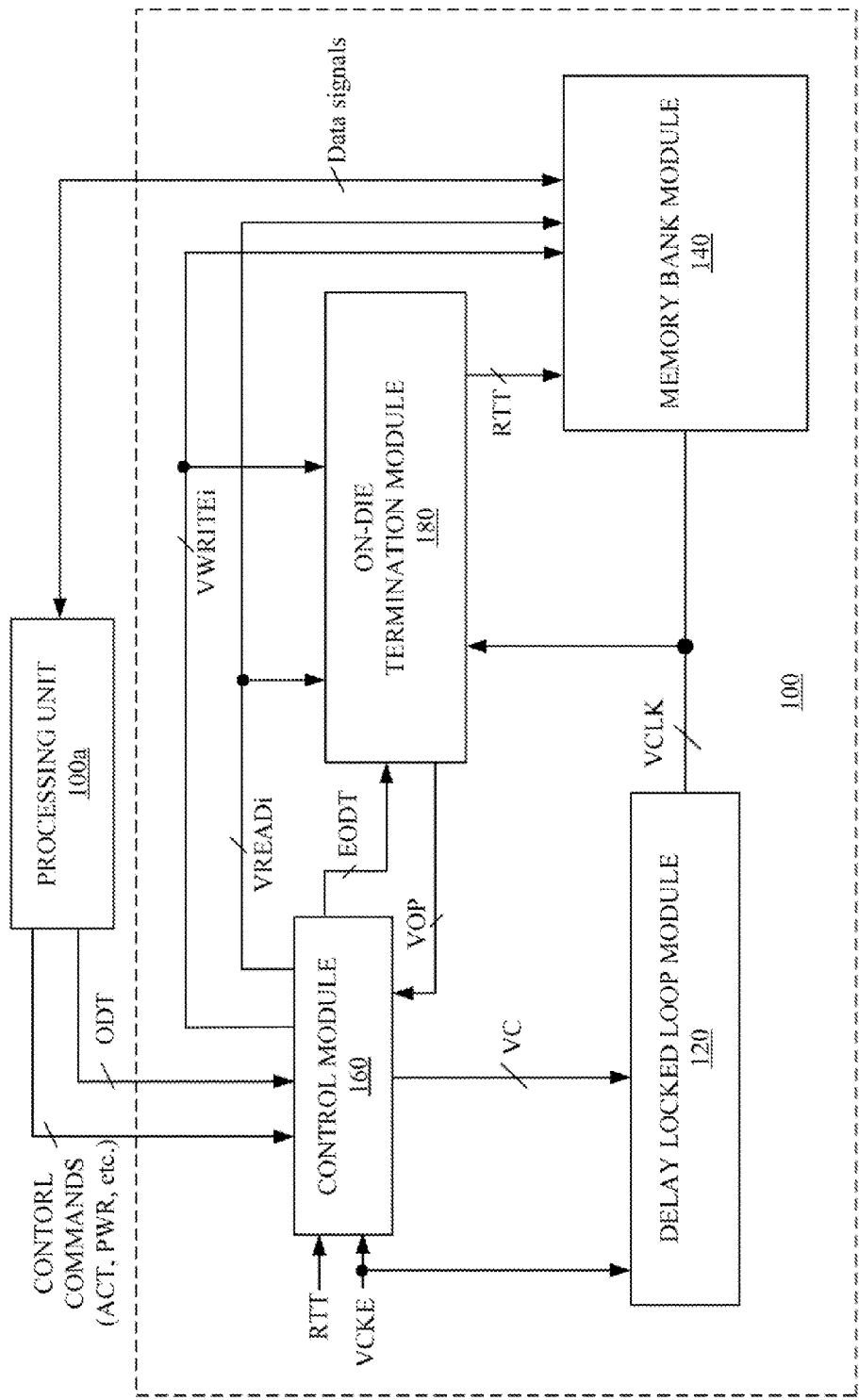
FIG. 1 is a schematic diagram of a memory device according to one embodiment of present disclosure.

Reference will now be made in detail to the present embodiments of the invention, examples of which are illustrated in the accompanying drawings. Wherever possible, the same reference numbers are used in the drawings and the description to refer to the same or like parts.

Although the terms "first," "second," etc., may be used herein to describe various elements, these elements should not be limited by these terms. These terms are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

In this document, the term "coupled" may be termed as "electrically coupled", and the term "connected" may be termed as "electrically connected". "Coupled" and "connected" may also be used to indicate that two or more elements cooperate or interact with each other.

FIG. 1 is a schematic diagram of a memory device according to one embodiment of present disclosure. As shown in FIG. 1, the memory device 100 includes a delay locked loop module 120, a memory bank module 140 and a control module 160. The memory device 100 is electrically coupled to a process unit 100a for proper operations. In some embodiments, the process unit 100a is a CPU.

The delay locked loop module 120 is configured to generate a system clock signal VCLK when enabled by a control signal VC generated from the control module 160.

The memory bank module 140 is configured to read or write a plurality of data signals in accordance with the system clock signal VCLK and a read/write command.

The control module 160 is configured to receive control commands asserted from process unit 100a to generate the control signal VC. The control module 160 generates a plurality of internal control signals, corresponding to the control commands, to control the delay locked loop module 120 and the memory bank module 140. The control module 160 disables the delay locked loop module 120 by the configuring control signal VC, when the memory bank module 140 goes to a precharge mode or a powerdown mode, and thus the power consumption of the memory device 100 can be reduced.

Figure 2:
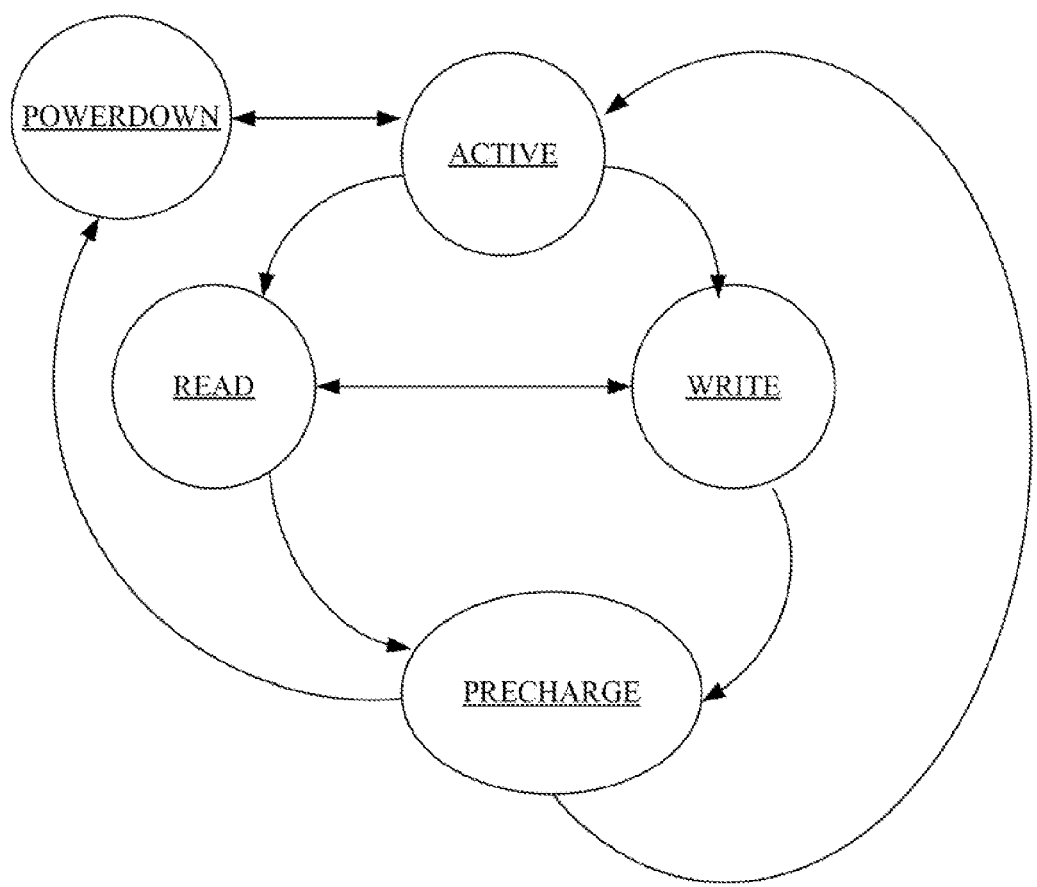
FIG. 2 is a flow chart of operation modes to the memory device in FIG. 1.

FIG. 2 is a flow chart of operation modes to the memory device in FIG. 1. As shown in FIG. 2, the memory device 100 is able to operate in a powerdown mode, an active mode, a read mode, a write mode or a precharge mode. For illustration, table 1 lists the operation modes in FIG. 2 and the corresponding descriptions.

TABLE 1

Operation modes in FIG. 2 and the corresponding descriptions

| Mode (command) | Description |
| --- | --- |
| ACTIVE | Active a row of the memory bank module 140 for subsequent access. |
| READ | Readout the data signals of the row in the memory bank module 140. |
| WRITE | Write the data signals to the row of memory bank module 140. |
| PRECHARGE | Deactivate the row in the memory bank module 140. |
| POWERDOWN | Deactivate certain circuits, such as I/O buffers, in the memory device 100 for maximum power savings. |

In some embodiments, the control module 160 may include a register (not shown in FIG. 1). The control module 160 generates the internal control signal, corresponding to the control command, to control the memory bank module 140 by referring information stored in the register. Then, the memory bank module 140 goes to a corresponding operation mode shown in FIG. 2 in accordance with the internal control signal.

For example, when the process unit 100a asserts a read command to the control module 160, the control module 160 accordingly generates an internal read signal VREADi to the memory bank module 140. Then, the memory bank module 140 goes to the read mode to readout the data signals in the memory bank module 140. Similarly, the internal write signal VWRITEi corresponds to the write command for write operation.

The following paragraphs will discuss some embodiments about the memory device 100 in this invention. For purpose of specification, many details in practice will be described together with the following description. However, it should be understood that these details in practice are not used to limit the disclosure.

Figure 3A:
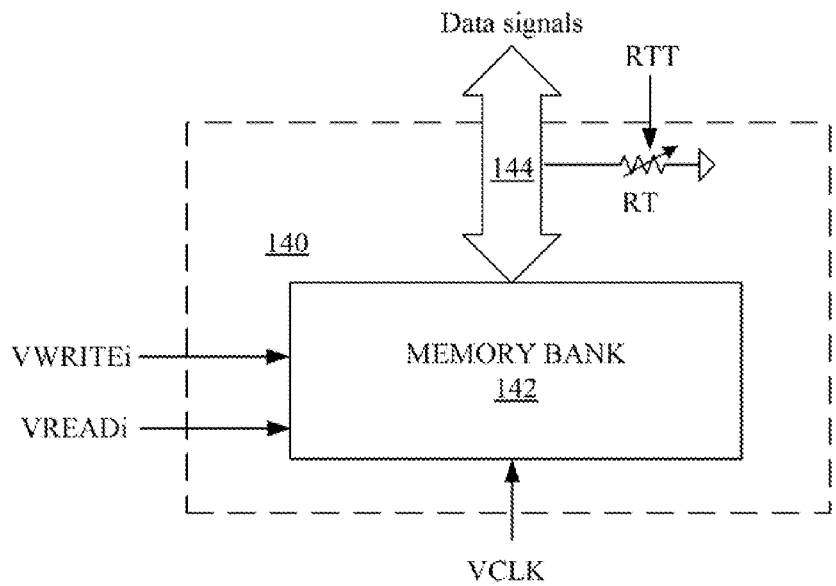
FIG. 3A is a schematic diagram of a memory bank module according to one embodiment of the present disclosure.

FIG. 3A is a schematic diagram of a memory bank module according to one embodiment of the present disclosure. As shown in FIG. 3A, the memory bank module 140 includes a memory bank 142, a data bus 144 and a termination resistor RT. The memory bank 142 includes multiple rows and columns of storage units for storing data signals. The memory bank 142 is electrically coupled to the termination resistor RT through the data bus 144. The termination resistor RT is configured to minimize signal reflections and jitters during the read operation or write operation, and thus keeping the integrity of the data signals.

In this embodiment, as shown in FIG. 1, the memory device 100 further includes an on-die termination module 180. The on-die termination module 180 is configured to adjust the value of the termination resistor RT in accordance with a termination control signal EODT generated from the control module 160. The control module 160 generates the termination control signal EODT when receiving a termination signal ODT from the processing unit 100a. The on-die termination module 180 generates a first progress signal VOP when adjusting the termination resistor RT. The first progress signal VOP is used to indicate that the adjustment to the termination resistor RT is in progress.

The on-die termination module 180 performs a nominal termination or a dynamic termination with the system clock signal VCLK to adjust the value of the termination resistor RT by sending a adjust signal RTT. The nominal termination can be used in certain standby conditions. The dynamic termination is used during the write operation. When the write operation is completed, the value of the termination resistor RT changes back to the value of the nominal termination.

In other words, in order to disable the delay locked loop module 120 after the on-die termination module 180 finishes adjusting the termination resistor RT, the control module 160 is further configured to generate the control signal VC in accordance with the first progress signal VOP.

Therefore, in this embodiment, the control module 160 keeps the delay locked loop module 120 being enabled till the adjustment to the termination resistor RT is completed, when the memory bank module 140 goes to the precharge mode or the powerdown mode.

Figure 3B:
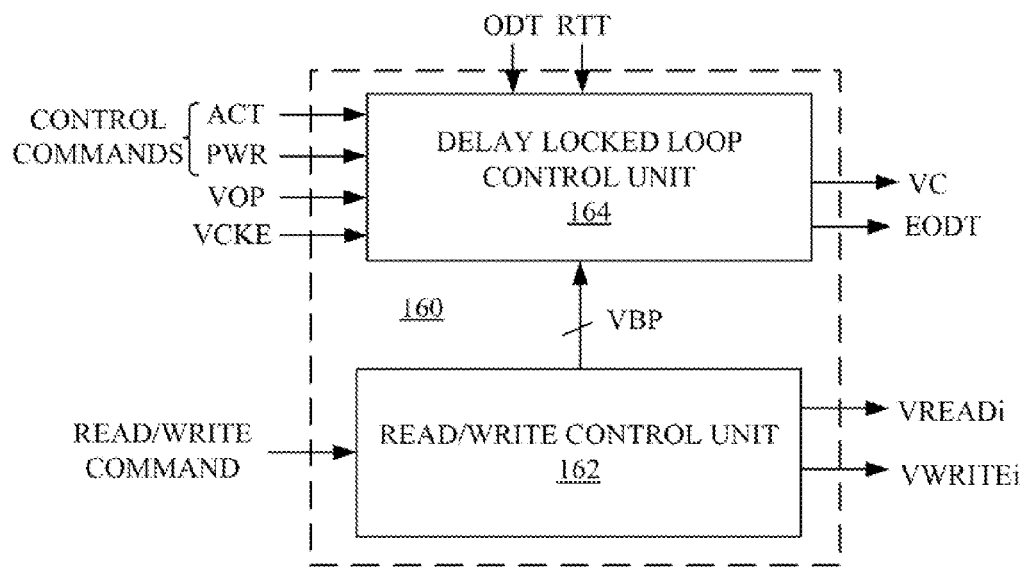
FIG. 3B is a schematic diagram of a control module according to one embodiment of the present disclosure.

FIG. 3B is a schematic diagram of a control module according to one embodiment of the present disclosure. As shown in FIG. 36, the control module 160 includes a read/write control unit 162 and a delay locked loop control unit 164.

The read/write control unit 162 is configured to generate a second progress signal VBP, the aforementioned internal read signal VREADi and the internal write signal VWRITEi in accordance with a read command or a write command. The second progress signal VBP indicates that the read write operation or the write operation is in progress.

The delayed locked loop control unit 164 is configured to generate the control signal VC in accordance with the first progress signal VOP, the second progress signal VBP and the internal control signals, such as ACT and PWR, corresponding to the active command and the powerdown command in table 1. Further, the delayed locked loop control unit 164 is also configured to generate the termination control signal EODT in accordance with the termination signal ODT.

As the memory device 100 performs read operation and the write operation with the system clock signal VCLK, the control module 160 keeps the delay locked loop module 120 being enabled till the read operation or the write operation is completed, when the memory bank module 140 is at a precharge mode or a powerdown mode.

Figure 3C:
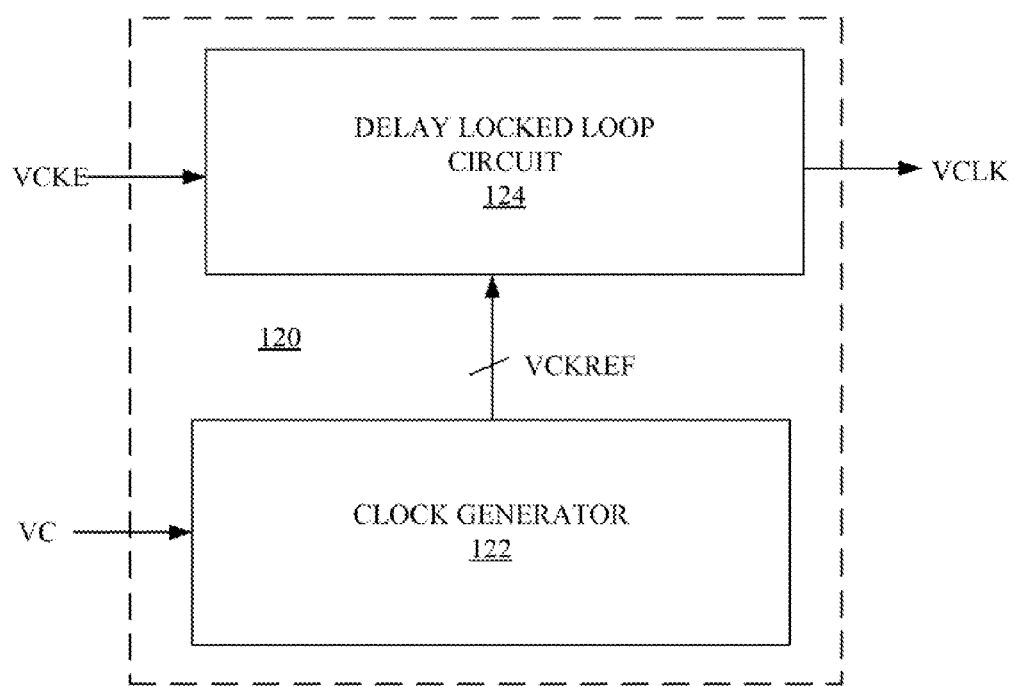
FIG. 3C is a schematic diagram of a delay locked loop module according to one embodiment of the present disclosure.

FIG. 3C is a schematic diagram of a delay locked loop module according to one embodiment of the present disclosure. As shown in FIG. 3C, the delay locked loop module 120 includes a clock generator 122 and a delayed locked loop circuit 124.

The clock generator 122 is configured to generate a reference clock signal VCKREF in accordance with the control signal and an external clock signal VCKE. The clock generator 122 is enabled by the control signal VC and generates the reference clock signal VCKREF by referring the external clock signal VCKE.

The delayed locked loop circuit 124 is configured to generate the system clock signal VCLK in accordance with the reference clock signal VCKREF. In some embodiments, the delayed locked loop circuit 124 is glitch tolerant, and thus the delay locked loop module 120 can operate correctly with glitches when being enabled or disabled.

In some embodiments, the control module 160 is a controller chip. In some embodiments, the control module 160 is a program code carried on a computer-readable medium. In other words, the control module 160 can be implemented in hardware, software, firmware, and the combination thereof. For illustration, if speed and accuracy are determined to be paramount, a mainly hardware and/or firmware vehicle is selected and utilized. Alternatively, if flexibility is paramount, a mainly software implementation is selected and utilized.

Figure 4:
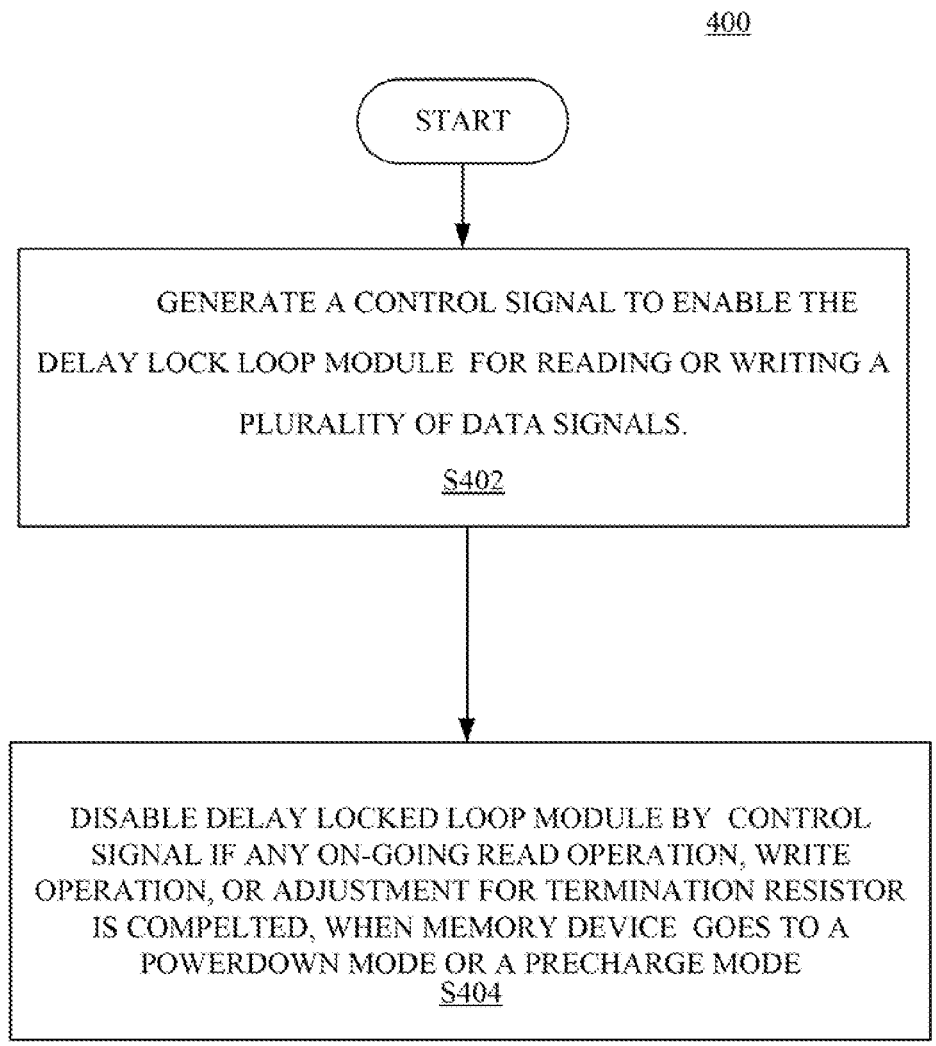
FIG. 4 is a flow chart of a control method illustrating operations of the memory device in FIG. 1 according to one embodiment of the present disclosure.
Figure 5A:
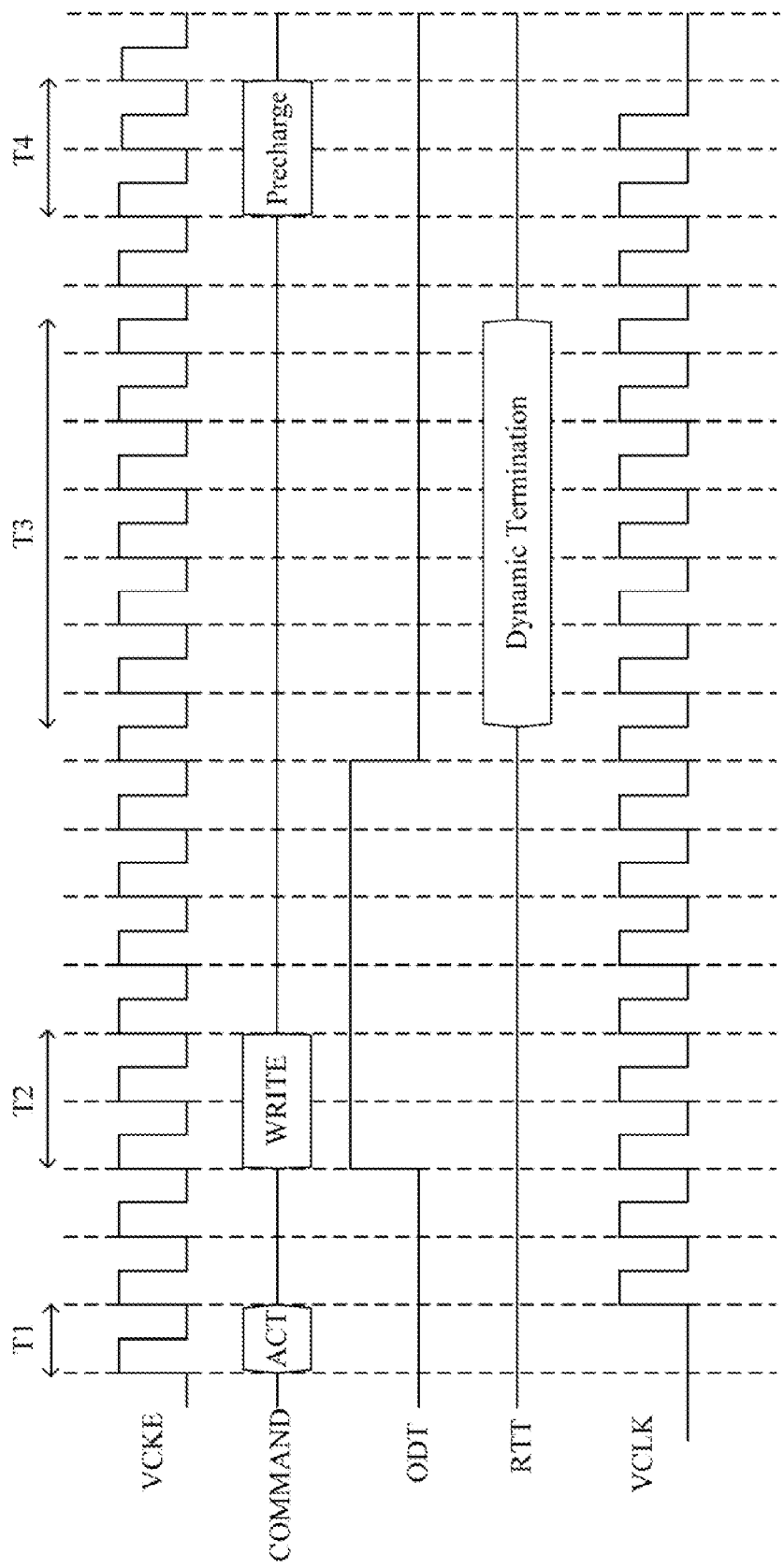
FIG. 5A is a graph illustrating an operation waveform of the memory device in FIG. 1 according to one embodiment of the present disclosure.
Figure 5B:
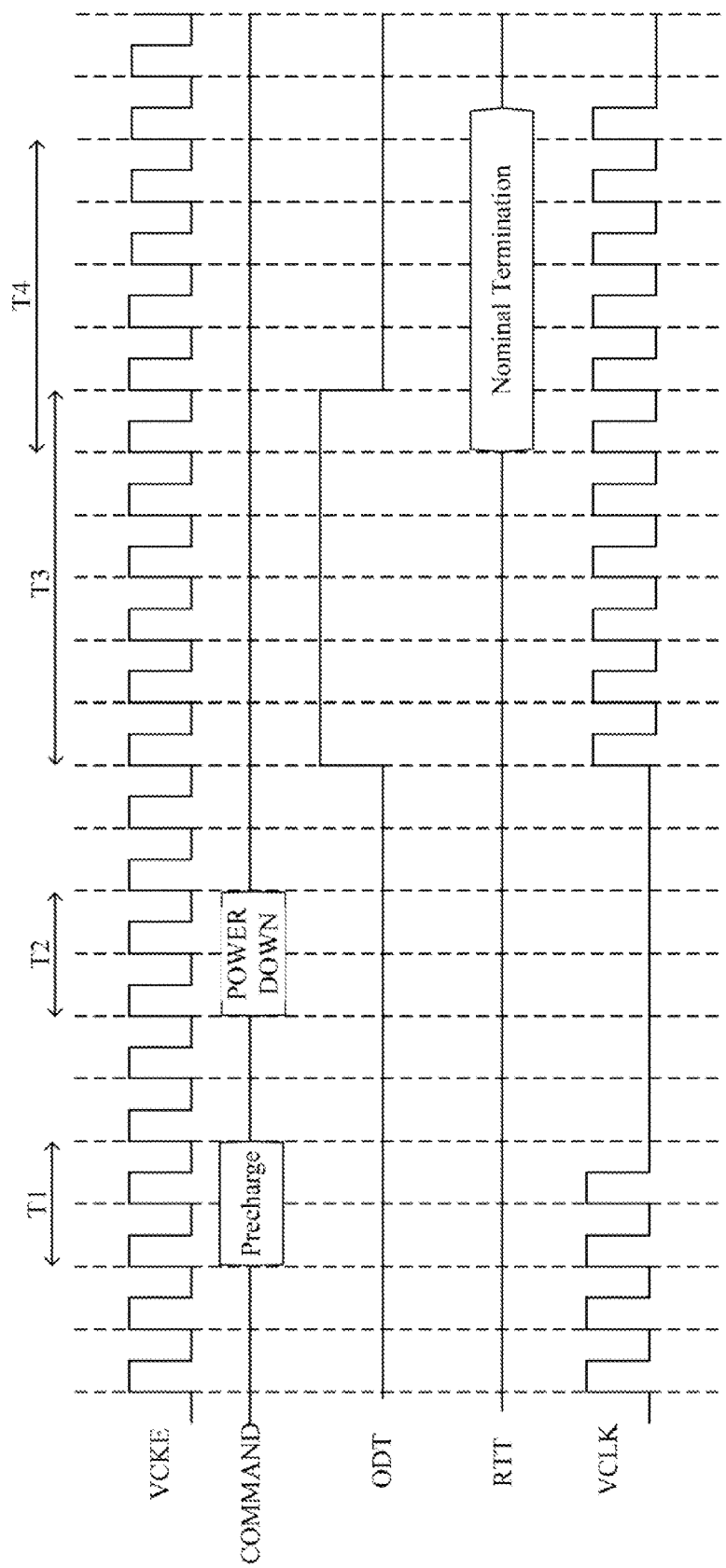
FIG. 5B is a graph illustrating an operation waveform of the memory device in FIG. 1 according to one embodiment of the present disclosure.
Figure 5C:
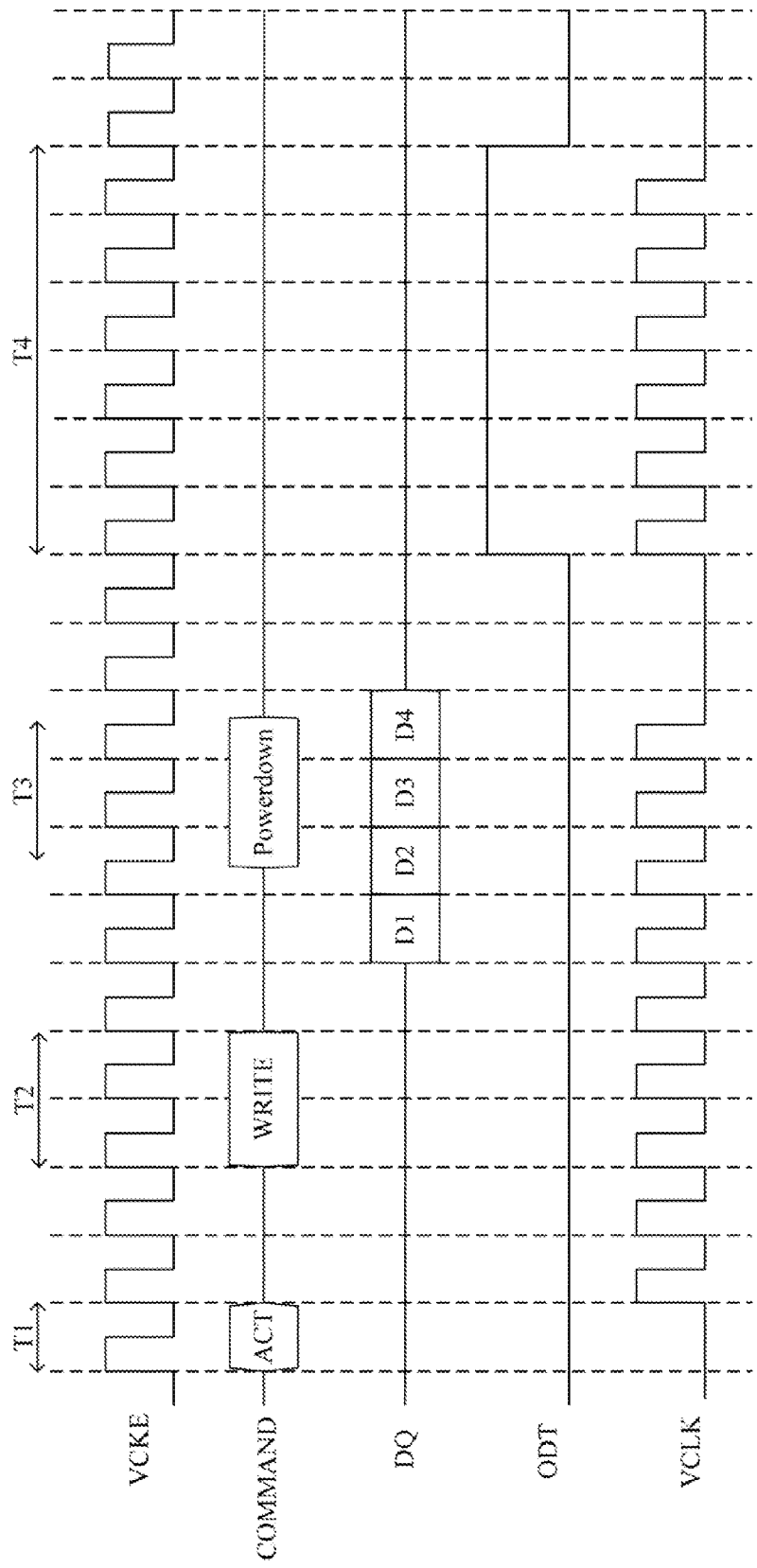
FIG. 5C is a graph illustrating an operation waveform of the memory device in FIG. 1 according to one embodiment of the present disclosure.

FIG. 4 is a flow chart of a control method illustrating operations of the memory device in FIG. 1 according to one embodiment of the present disclosure. FIG. 5A is a graph illustrating an operation waveform of the memory device 100 in FIG. 1 according to one embodiment of the present disclosure. FIG. 5B is a graph illustrating an operation waveform of the memory device 100 in FIG. 1 according to one embodiment of the present disclosure. FIG. 5C is a graph illustrating an operation waveform of the memory device 100 in FIG. 1 according to one embodiment of the present disclosure.

For illustration, the operations of the memory device 100 in FIG. 1 are respectively described by the method 400 with reference to FIG. 5A, FIG. 5B and FIG. 5C.

In operation S402, a control signal VC is generated to enable the delay lock loop module 120 for reading or writing a plurality of data signals.

In operation S404, the delay locked loop module 120 is disabled by the control signal VC, when the memory device 100 goes a powerdown mode or a precharge mode. To be specifically, in the operation S404, the delay locked loop module 120 is disabled if any on-going read operation, write operation, or adjustment for termination resistor is completed, when the memory device 100 goes the powerdown mode or the precharge mode.

For example, as shown in FIG. 5A, the system clock signal VCLK is turned off by the control signal VC (not shown in FIG. 5A) until the ACTIVE command is asserted from the processing unit 140a in the time period T1.

In the time period T2, the control module 160 receives a WRITE command and a termination signal ODT. The control module 160 accordingly generates the internal write signal VWRITEi to the memory bank module 140 for write operation.

In the mean time, the control module 160 accordingly generates the termination control signal EODT to enable the on-die termination module 180. The on-die termination module 180 performs the dynamic termination to adjust the termination resistor RT during the time period T3.

In the time period T4, the processing unit 100a asserts the precharge command, the memory bank module 140 goes to the precharge mode. Since there is no read/write operation in the progress, the control module 160 disables the delay locked loop module 120 to turn off the system clock signal VCLK, thereby the power consumption of the delay locked loop module 120 is saved during the precharge mode.

Alternatively, as shown in FIG. 5B, the processing unit 100a asserts the precharge command in the time period T1, and thus the memory bank module 140 goes to the precharge mode and the system clock signal VCLK is turned off by the control module 160.

In the time period T2, the processing unit 100a asserts the powerdown command, and the memory bank module 140 goes to the powerdown mode and the system clock signal VCLK is still turned off.

In the time period T3, the control module 160 receives the termination signal ODT. The control module 160 accordingly enables the on-die termination module 180 to perform the nominal termination to adjust the termination resistor RT. The delay locked loop module 120 is enabled to generate the system clock signal VCLK in the same time. After the termination resistor RT is adjusted in the time period T4, the delay locked loop module 120 is disabled again by the control module 160 to get a power saving in the memory device 100 during the powerdown mode.

Furthermore, as shown in FIG. 5C, the system clock signal VCLK turns on until the ACTIVE command is given in the time period T1. In the time period T2, the control module 160 receives the write command. The memory bank module 140 performs the write operation for writing data signals D1, D2, D3 and D4, shown as the data queue DQ on the data bus 144 in FIG. 5C.

In the time period T3, the processing unit 100a asserts the powerdown command. However, the previous write operation is not completed in the time period T3. The control module 160 keeps the delay locked loop module 120 enabled to generate the system clock signal VCLK. After the data signal D4 is transmitted, the memory bank module 140 goes to the powerdown mode and the system clock signal VCLK is turned off by the control module 160.

In the time period T4, the control module 160 receives the termination signal ODT and enables the on-die termination module 180 to adjust the termination resistor RT during the time period T4. The delay locked loop module 120 is accordingly enabled to generate the system clock signal VCLK in the same time. After the termination resistor RT is adjusted, the delay locked loop module 120 is disabled again by the control module 160.

In the embodiments shown in FIG. 5A, FIG. 5B and FIG. 5C, the memory device 100 can save about 2.5 mA of power in the powerdown mode and the precharge mode.

In summary, the present disclosure provides a memory device and a control method. The memory device is capable of save power and works correctly during a precharge mode or a powerdown mode.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. A memory device, comprising:
    a delay locked loop module configured to generate a system clock signal when enabled by a control signal;
    a memory bank module configured to read or write a plurality of data signals in accordance with the system clock signal and a read command or a write command, wherein the memory bank module comprises a termination resistor; and
    a control module configured to receive at least one control command to generate the control signal, wherein the control module disables the delay locked loop module, when the memory bank module goes to a precharge mode or a powerdown mode, and the control module disables the delay locked loop module after an adjustment to the termination resistor is completed.

2. The memory device of claim 1, wherein the memory device further comprises:
    an on-die termination module configured to perform the adjustment to adjust a value of the termination resistor in accordance with a termination control signal, wherein the control module is configured to generate the termination control signal in accordance with a termination signal.

3. The memory device of claim 2, wherein the control module disables the delay locked loop module after the memory bank module finishes reading or writing the data signals.

4. The memory device of claim 2, wherein the on-die termination module is configured to generate a first progress signal when adjusting the value of the termination resistor, and the control module disables the delay locked loop module in accordance with the first progress signal.

5. The memory device of claim 4, wherein the control module comprises:
    a read/write control unit configured to generate a second progress signal in accordance with a read command or a write command; and
    a delay locked loop control unit configured to generate the control signal in accordance with the first progress signal, the second progress signal and the least one control command.

6. The memory device of claim 1, wherein the delay locked loop module comprises:
    a clock generator configured to generate a reference clock signal when enabled by the control signal; and
    a delay locked loop circuit configured to generate the system clock signal in accordance with the reference clock signal.

7. A memory device, comprising:
    a control module configured to generate a plurality of internal control signals corresponding to at least one control command;
    a memory bank module configured to perform a read operation or a write operation with a plurality of data signals according to an internal read signal or an internal write signal of the internal control signals and a system clock signal, wherein the memory bank module comprises a termination resistor; and
    a delay locked loop module configured to generate the system clock signal when enabled by the control module,
    wherein the control module keeps the delay locked loop module being enabled till the read operation or the write operation is completed, when the memory bank module goes to a precharge mode or a powerdown mode, and the control module disables the delay locked loop module after an adjustment to the termination resistor is completed.

8. The memory device of claim 7, wherein the memory device further comprises:
    a on-die termination module configured to perform the adjustment to the termination resistor in accordance with a termination signal, wherein the control module is configured to generate the termination signal corresponding to a termination command.

9. The memory device of claim 7, wherein the control module keeps the delay locked loop module being enabled till the adjustment to the termination resistor is completed, when the memory bank module goes to the precharge mode or the powerdown mode.

10. A control method for a memory device, comprising:
    generating a control signal to enable a delay locked loop circuit of the memory device for reading or writing a plurality of data signals;
    disabling the delay locked loop circuit by the control signal when the memory device is at a powerdown mode or a precharge mode; and
    disabling a system clock signal after an adjustment to a termination resistor of the memory device is completed.

11. The control method of claim 10, further comprising:
    disabling the delay locked loop circuit after a read operation or a write operation of the memory device is completed.

12. The control method of claim 10, wherein the step of the disabling the delay locked loop circuit comprises:
    disabling the delay locked loop circuit in accordance with a first progress signal and a second progress signal, wherein the first progress signal indicates that the adjustment to the termination resistor of the memory device is in progress, and the second progress signal indicates that a read operation or a write operation of the memory device is in progress.

13. The control method of claim 12, wherein the memory device comprises a clock generator, the clock generator being configured to generate a reference clock signal in accordance with the control signal, and the delay lock loop circuit being configured to generate a system clock signal in accordance with the reference clock signal, wherein the step of the disabling the delay locked loop circuit comprises:
    generating the control signal in accordance with the first progress signal and the second progress signal to disable the clock generator.

* * * * *